Jan. 30, 1962 — L. E. LEFEVRE — 3,018,550
FABRIC CUTTING TOOL
Filed Aug. 4, 1960

INVENTOR.
Lloyd E. Lefevre
BY Earl D. Ayers
AGENT 3,018,550
FABRIC CUTTING TOOL
Lloyd E. Lefevre, Bay City, Mich., assignor to The Dow Chemical Company, Midland, Mich., a corporation of Delaware
Filed Aug. 4, 1960, Ser. No. 47,423
5 Claims. (Cl. 30—140)

This invention relates to the art of cutting fabrics and particularly to apparatus which is useful for cutting synthetic fabrics.

Conventional commercial fabric cutters often consist of driven sharpened blades which operate in a slot in a base plate. The plate is so designed as to slip under the fabric to be cut, raising the fabric to a level which allows the blade to cut through the fabric without making contact with the table top. The units are also often equipped with sharpening wheels which can readily be engaged for blade sharpening.

While such fabric cutters perform very well with many kinds of fabrics, their performance with various synthetic fabrics such as "Saran," "Nylon," "Orlon," "Dynel," "Arnel," and "Rovana," for example, has been less satisfactory than has been desired, particularly with reference to the tendency of these fabrics to fray along the cut edges.

Accordingly, a principal object of this invention is to provide an improved fabric cutting device.

Another object of this invention is to provide an improved fabric cutting device for use with synthetic fabrics which lessens the danger of fraying along the cut edges of the fabric.

Yet another object of this invention is to provide an improved fabric cutting and sealing device which also provides a decorative effect along the cut edge of the fabric.

In accordance with this invention there is provided a fabric cutting tool having a handle to which is attached a rotatable semi-sharp metal cutting disc having an electrical resistance heating element member in frictional contact therewith. A sealing disc which is in frictional contact with the cutting disc is spring loaded to bear against the fabric being cut and thereby seal the cut edge of the fabric.

The above and related objects and advantages of the invention will best be understood when the following detailed description is read in connection with the accompanying drawing, in which FIG. 1 is a side elevational view of the apparatus of this invention;

Figure 2:
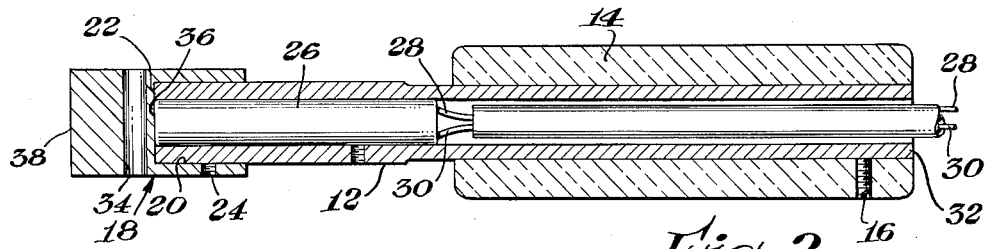
FIG. 2 is a sectional view of the handle and heating block of the device taken along the line 2—2 of FIG. 1.

Referring to the drawings, there is shown a cutting and sealing tool, indicated generally by the numeral 10, including a tubular body member 12 having a handle 14 of heat insulating material secured to one end part thereof by means of a recessed set screw 16 (see FIG. 2).

A metal block of generally rectangular transverse cross sectional configuration, generally indicated as 18, having a longitudinally disposed axial bore 20 therein, is telescoped over the end 22 of the body member 12 and held in place by a set screw 24.

A cartridge type resistance heating element 26 having an outer diameter of approximately the same size as the inner diameter of the body member 12, is disposed within the tubular body member 12 with its end contiguous with the block 18. Electrical leads 28, 30, suitably insulated, are brought out through the handle end 32 of the body member 12 to a suitable plug or connector (not shown).

Figure 1:
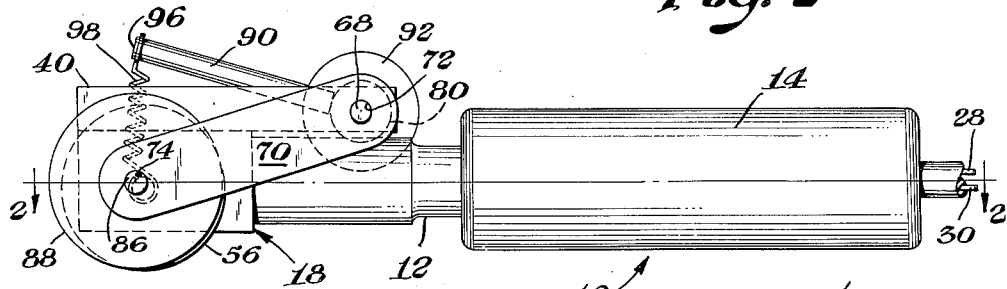
Figure 3:
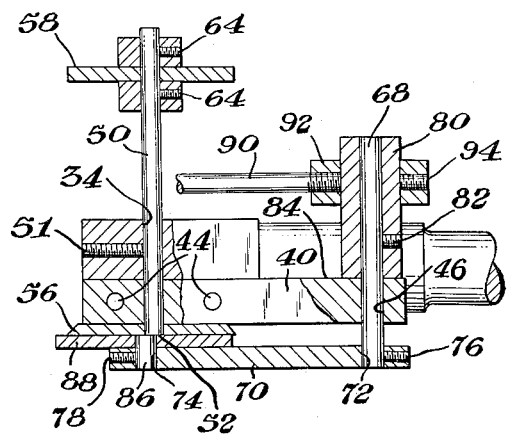
FIG. 3 is a fragmentary view, partly in section, of the working end of the tool shown in FIG. 1.
Figure 4:
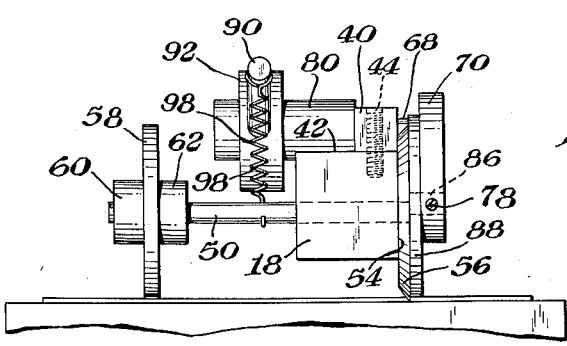
FIG. 4 is a sectional view taken along the line 4—4 of FIG. 3.

Referring to FIGS. 3 and 4, as well as to FIGS. 1 and 2, it may be seen that block 18 has a bore 34 which extends transversely of the block generally perpendicularly to and aligned with the longitudinal axial bore 20. The bore 34 lies between the inner end 36 of the bore 20 and the forward end 38 of the block 18.

An elongated rectangular shaped metal bar 40 is secured to the top 42 of the bar 18 by means of bolts 44. A transverse bore 46 which is parallel to the bore 34 extends through the bar 40 near the rear end 48 thereof.

Returning to the block 18, a shaft 50 extends through the bore 34 and is held in fixed relationship thereto by the set screw 51. One end 52 of the shaft 50 extends slightly beyond the side 54 of the block. A semi-sharp cutting disc 56 having an axial bore fits closely but freely rotatably over the end 52 of shaft 50. The disc 56 is much larger in diameter than its width dimension and its cross-sectional configuration is that of an isosceles trapezoid. The disc 56 lies against the flat side 54 of the block 18, the large contact area permitting easy transfer of heat from the block 18 to the disc 56. Near the other or "outboard" end of the shaft 50 a freely rotatable wheel 58 of approximately the same diameter as that of the cutting disc 56 is held in place by annular spacer elements 60, 62 which are secured to the shaft 50 by set screws 64. The position of the outboard wheel may, of course, be adjusted with respect to the block 18 by changing the location of the spacer elements 60, 62.

A second shaft 68 extends in slidable but close fitting relationship through the bore 46. An arm element 70 having bores 72, 74 near each of its ends and set-screws 76, 78 respectively communicating with the bores, is rigidly coupled to the shaft 68 through the bore 72 and set screw 76. A sleeve 80 having a set-screw 82 is fitted over the shaft 68 and is contiguous to the side 84 of the block 40. A short shaft 86 held in place in the bore 74 by the set-screw 78 has an annular flat sided pressure disc 88 which is about ⅛ inch wide rotatably mounted thereon. The thickness of the pressure disc is at least as great as that part of the length of the short shaft 86 which extends from the arm 70 towards the cutting disc 56.

With the pressure disc 88 in place against the cutting disc 56, the sleeve 80 is pushed against the side 84 of the block 40 and the set screw tightened. This arrangement holds both the cutting disc and pressure disc onto their respective shafts yet permits the rapid changing of both discs by loosening the sleeves enough to slide the shaft 68 forward a short distance.

In operation the heater is plugged into an electrical energy source and the unit is allowed to heat until a blade temperature of approximately 250 degrees centigrade is reached. The synthetic fabric to be cut and sealed is laid out flat on a smooth surface (such as a "Transite" board) and marked in some manner such as with a pencil or straight edge. Guiding the cutting disc edge along the line (marked or imaginary), while applying moderate pressure down, completes the cutting operation. As pressure is applied the pressure disc is forced against the fabric (spring 98 determines the pressure) and, being heated by virtue of its contact with the cutting disc and through the arm 70, seals the cut edge of the fabric.

The block 18, highly heated by the heater element 26, is in large area contact with the cutting disc 56, thus making possible rapid heat transfer to the two discs 56 and 88. The "outboard" wheel makes it possible to easily maintain the same cutting and sealing surfaces against the fabric.

It should be noted that the cutting disc or blade temperature should be above the sticking temperature of the fabric for relatively slow cutting speeds and light pressure applications. The cutting blade temperature needs to be increased to allow for heat transfer to the fabric at increased cutting rates. If the temperature is too low cutting would require excessive pressure and there would be no sealing.

If temperature control of the device is desired, a cartridge type thermostatic control element may be embedded in the outer end part of the block 18 and connected in series with the electrical leads 28, 30.

Adjustment of the tension on the arm 70 is easily achieved by increasing or decreasing the angle the arm 90 makes with respect to the arm 70.

A tensioning arm 90, rigidly coupled to a bushing 92 is fixedly but detachably coupled to the sleeve 80 on shaft 68 by means of set screw 94. The tensioning arm 90 and the arm element 70 are disposed at an angle with respect to each other. The free or outer end of the arm 90 is considerably above the shaft 50 while the outer end of the arm element 10 is near the height of the shaft 50. A spring 98 is coupled between the outer end 96 of tension arm 90 and the shaft 50 so that the spring is under tension when the cutting disc and pressure disc are bearing against a fabric.

What is claimed is:

1. A cutting and fiber edge sealing tool for use with synthetic fabrics, comprising a hollow, elongated body member having a handle secured to one end part thereof and a block-like member having an axial bore telescoped over another end part in close fitting sliding relationship therewith, said block-like member being rigidly secured to said body member, an electrical resistance element, said resistance element being disposed within said body member and contiguous to said block-like member, lead means for said resistance elements, said block-like member having a transverse bore extending therethrough which is generally perpendicular to said axial bore, said transverse bore having a rotatable shaft slidably extending therethrough, a cutting disc, said cutting disc being rotatably carried on said transverse shaft contiguous to said block-like member, a pivot arm having an upper and lower end, means for rotatably securing the upper end part of said pivot arm to said block-like member on the side of said cutting disc which is remote from said block-like member, said lower end part having a short shaft extending towards said cutting disc, a pressure disc, said pressure disc being axially and rotatably mounted on said short shaft and in sliding contact with said cutting disc, and resilient means for maintaining said pressure disc under pressure when said cutting disc and said pressure disc bear against a surface.

2. A tool in accordance with claim 1, wherein said shaft which extends through said transverse bore has a wheel-like disc of similar diameter to said cutting disc rotatably mounted thereon on the opposite side of the block-like member.

3. A tool in accordance with claim 1, wherein said cutting disc has generally flat sides and is in large area contact with said block-like member and with said pressure disc.

4. A tool in accordance with claim 1, wherein said means for rotatably securing the upper end part of said pivot arm includes a second transverse shaft which is fixedly disposed with respect to said block-like member and is parallel to said rotatable shaft and said short shaft.

5. A tool in accordance with claim 4, wherein a tension arm extends from and is fixedly secured to said second shaft, and means including a spring are provided for coupling said tension arm to said block-like member.

References Cited in the file of this patent

UNITED STATES PATENTS 2,924,694 Kreider _____ Feb. 9, 1960

FOREIGN PATENTS 545,318 Belgium _____ Mar. 15, 1960